(12) United States Patent
Verschuur et al.

(10) Patent No.: US 7,077,332 B2
(45) Date of Patent: Jul. 18, 2006

(54) MEDIA VERIFICATION SYSTEM

(75) Inventors: Gerrit L. Verschuur, Lakeland, TN (US); David M. Uland, Granville, OH (US); Chauncey T. Mitchell, Jr., Lakeland, TN (US)

(73) Assignee: Translucent Technologies, LLC, Algoma, WI (US)

( * ) Notice: Subject to any disclaimer, the term of this patent is extended or adjusted under 35 U.S.C. 154(b) by 97 days.

(21) Appl. No.: 10/805,069

(22) Filed: Mar. 19, 2004

(65) Prior Publication Data

US 2005/0006472 A1 Jan. 13, 2005

Related U.S. Application Data

(60) Provisional application No. 60/498,893, filed on Aug. 29, 2003, provisional application No. 60/455,979, filed on Mar. 19, 2003.

(51) Int. Cl.
*G06K 19/06* (2006.01)

(52) U.S. Cl. .................. 235/492; 235/493; 235/494

(58) Field of Classification Search ............... 235/493, 235/462.25, 492, 494
See application file for complete search history.

(56) References Cited

U.S. PATENT DOCUMENTS

| | | | |
|---|---|---|---|
| 4,982,073 A | 1/1991 | Stenzel | |
| 5,365,586 A | 11/1994 | Indeck et al. | |
| 5,428,683 A | 6/1995 | Indeck et al. | |
| 5,471,039 A | 11/1995 | Irwin, Jr. et al. | |
| 5,625,689 A | 4/1997 | Indeck et al. | |
| 5,667,250 A | 9/1997 | Behm et al. | |
| 6,053,406 A | 4/2000 | Litman | |
| 6,136,468 A | 10/2000 | Mitchell, Jr. et al. | |
| 6,193,156 B1 | 2/2001 | Han et al. | |
| 6,202,929 B1 * | 3/2001 | Verschuur et al. | 235/462.25 |
| 6,379,742 B1 | 4/2002 | Behm et al. | |
| 6,547,151 B1 | 4/2003 | Baldi | |
| 6,696,127 B1 | 2/2004 | Mitchell, Jr. | |
| 2003/0136837 A1 | 7/2003 | Amone et al. | |
| 2004/0104273 A1 | 6/2004 | Nakamura | |
| 2004/0217177 A1 | 11/2004 | Hoppe et al. | |

FOREIGN PATENT DOCUMENTS

WO   WO 98/49652   * 11/1998

* cited by examiner

*Primary Examiner*—Daniel Stcyr
*Assistant Examiner*—Daniel A. Hess
(74) *Attorney, Agent, or Firm*—Thomas B. Ryan; Stephen B. Salai, Esq.; Harter, Secrest & Emery LLP

(57) ABSTRACT

A unique conductivity pattern is applied to printable articles to provide a "signature" for later verifying the authenticity of the printable articles. Preferably, the conductivity pattern is hidden from sight and differs from other conductivity patterns applied to other printable articles in an effectively random manner. Capacitive sensors read the conductivity patterns, and the resulting data for recording the signatures reflects not only details of the conductivity patterns themselves but also the characteristics of the capacitive sensors and their use.

22 Claims, 9 Drawing Sheets

MEDIA VERIFICATION SYSTEM

CROSS-REFERENCE TO RELATED APPLICATIONS

Priority is claimed to both U.S. Provisional Application 60/455,979 filed Mar. 19, 2003 and to U.S. Provisional Application 60/498,893, filed Aug. 29, 2003, both of which are hereby incorporated by reference.

BACKGROUND OF THE INVENTION

1. Field of the Invention

The invention relates to printable articles modified for incorporating unique identifying information and to methods and apparatus for acquiring and processing the unique identifying information, particularly for purposes of evaluating the authenticity of the printable articles.

2. Description of Related Art

Tags, tickets, labels, cards, coupons, currency, forms, game pieces, documents and other articles identified by or subject to printing (hereinafter referred to as print media or printable articles) arranged for conveying value or authenticity are subject to counterfeiting and tampering. For example, cards and tickets used in coinless slot machines can be tampered with or counterfeited so that the counterfeiter can claim more winnings than are their due. Garment tags or labels can be reproduced to claim false sources of the garments.

BRIEF SUMMARY OF THE INVENTION

The invention in one or more of its preferred embodiments associates a unique "signature" or "fingerprint" with individual print media in the form of a random arrangement of features or features subject to such variation as to be effectively random. Preferably, the signature is not known to anyone until the individual media is first dispensed or otherwise distributed. The unique signatures can be identified and recorded upon distribution of the media so that the media can be later recognized in connection with their use. The recorded signatures alone can be later used to identify the individual media or the recorded signatures can be stored in association with other identifying information about the individual media.

According to one embodiment, a set of printable articles having conductivity signatures in accordance with the invention includes a plurality of printable substrates and a conductive material associated with each of the printable substrates. The conductive material is distributed among the printable substrates so that the conductive material contributes to the formation of individual conductivity patterns on the printable substrates. The conductivity patterns are detectable as unique signatures that differ from each other in an effectively random manner. Capacitive sensors, for example, can detect the conductivity signatures.

Preferably, the conductivity patterns are applied directly or indirectly to the substrates by printing with an electrically conductive medium, such as an electrically conductive ink. Variations in electrical conductivity with position provide a detectable signature. Thus, it is not necessary for the conductive medium to contain pigments for the purpose of forming a capacitive signature, although the conductive medium can contain pigments for the additional purpose of conveying visible information. Beyond the variations in electrical conductivity associated with the appearance of the printed patterns, the electrical conductivity characteristics can be further varied as a result of variations in the conductive medium or in the substrates as well as with variations in the relationship between the conductive medium and the substrates. Thus, merely reproducing the printed pattern of the conductive medium does not necessarily reproduce the conductivity pattern associated with the printed pattern.

Each of the conductivity patterns preferably includes conductivity characteristics that are free to vary over a continuum. The conductive material is preferably distributed within distinct areas that are discontinuous to avoid conductive connections between the beginning and end of the conductivity patterns. The conductivity patterns are affected by variations in distributions of the conductive medium over surfaces of the printable substrates, by variations in the distributions of the conductive medium with respect to a depth dimension of the printable substrates normal to the surfaces or the printable substrate, and by variations in distributions of conductivity within the surface and depth distributions of the conductive medium.

The printable substrates can be treated in advance of the application of the conductive medium to the printable substrates for further varying the conductivity patterns between the printable substrates. The advance treatment of the printable substrates can be arranged to vary locally between the substrates so that an interaction of the conductive medium with the printable substrates also varies locally between the printable substrates. The advance treatment of the printable substrates can affect both the porosity and surface morphology of the printable substrates.

The printable substrates can also be treated subsequent to the application of the conductive medium to the printable substrates for further varying the conductivity patterns between the printable substrates. The subsequent treatment of the printable substrates can also be arranged to vary locally between the substrates so that an interaction of the conductive medium with the printable substrates also varies locally between the printable substrates. The subsequent treatment can redistribute conductive material on the printable substrates.

Another embodiment features print media with individualized signatures formed from a web that is divided into a succession of printable articles, each having a conductivity pattern. The conductivity patterns differ between the printable articles with a variability that is effectively random and detectable as signatures that differ from each other.

Preferably, the conductivity patterns are at least partially formed on the web prior to dividing the web into the succession of printable articles and the differences between the conductivity patterns are formed by one or more in-line processes that are not repeated in registration with the succession of printable articles. For example, the in-line processes can include printing out of registration with the succession of printable articles so that the printed patterns differ between printable articles in an effectively random manner.

The conductivity patterns can be at least partially formed by a printable conductive medium that is applied in patterns. However, the conductivity patterns preferably differ from the patterns of the conductive medium in accordance with other variables that affect conductivity characteristics within the patterns of the conductive medium. Such other variables can include variations within the conductive medium, the web, or interactions between the conductive medium and the web.

The print medium can be applied directly to the web or other substrate or can be applied to another web or substrate and transferred onto the web or substrate, or the two webs or substrates can be laminated together. The additional web or substrate provides enhanced flexibility for accepting the print medium and can also be employed in the construction of a laminate.

A laminated article having an internal identification feature in accordance with another embodiment invention is arranged with first and second substrates. A layer of adhesive is on the second substrate, and an identification feature is printed on the layer of adhesive while on the second substrate. The first and second substrates are bonded together through the adhesive layer embedding the identification feature between the two substrates.

Preferably, the identification feature is a conductivity pattern, and the conductivity pattern is formed at least in part by a printable conductive medium. The conductivity pattern can be affected in a variety of ways including by varying distributions of the conductive medium over a surface of the adhesive layer and distributions of conductivity within the surface distributions of the conductive medium. In addition, the conductivity pattern can be subject to further variation by varying a distribution of the conductive medium with respect to a depth dimension of the adhesive layer.

A transfer-printed article incorporating an identification feature in accordance with another embodiment of the invention includes a first substrate, a conductive material, an adhesive material, and an overlying material. The conductive material is transferred together with the adhesive and the overlying material onto the first substrate from a second substrate so that the conductive material is set by the adhesive material between the first substrate and the ovedying material for uniquely identifying the article.

The conductive material is preferably arranged in a pattern that is detectable as a unique identifier. Preferably, the adhesive material bonds the overlying material to the first substrate, and the conductive material is embedded within an adhesive material. The overlying material can be a magnetic material, which is transferred onto the first substrate in the form of a magnetic stripe capable of encoding information magnetically. Alternatively, the overlying material can be ink, and the conductive material can be arranged on the first substrate in a pattern that is different from a pattern of the overlying ink material.

A magnetic tape having a conductivity signature in accordance with another embodiment of the invention includes a magnetic film having a length and front and back surfaces. An adhesive layer is on the back surface of the magnetic film, and a conductivity pattern is applied to the adhesive layer in a form that varies in an effectively random manner along the length of the magnetic film. The conductivity pattern is preferably formed at least in part by a printable conductive medium that is subject to variations in distribution across and within the adhesive layer. Alternatively, the conductivity pattern could be applied to the front or back surfaces of a backing film for the magnetic material of the magnetic film or can be applied between the magnetic material and an adhesive layer for mounting the magnetic film on another substrate.

Although the induced variations in conductivity with position on the various media contain random or at least highly variable elements, the magnitudes of the induced variations are preferably within ranges matched with the sensitivities of sensor systems used to read the conductivity signatures. Conductivity that is too low can escape detection. Conductivity that is too high can over-saturate the sensors and be indistinguishable from other conductivity amounts that also over-saturate the sensors. Accordingly, some part of the variation in conductivity is preferably controlled to influence the range of conductivity variation and to assure that a detectable signature is produced. However, another part of the variation is preferably uncontrolled and subject to indeterminate or random variations.

For example, variables associated with the conductive medium, the substrate or substrates comprising the print media, or the printing process can be allowed to vary within prescribed ranges. Random variations in conductivity can be superimposed upon more ordered variations in conductivity. The printed pattern itself can be varied within defined limits to assure both that a sufficient portion of a signature is present and that the signature does not occupy all available space. The conductivity content of the ink or other processing parameters can be allowed to vary of their own accord or as a result of interactions with other controls to superimpose further variation in the conductivity signature, which is not apparent from the printed patterns themselves. Curing or aging effects of the conductive ink can further vary the conductivity signature in an effectively random manner.

The variations in the conductivity characteristics of the conductivity patterns for defining the unique signatures are referred to as "effectively random", which is intended to cover situations in which the resulting conductivity pattern includes conductivity characteristics that are arrived at by chance more than design by deliberately introducing one or more sources of variation that are not sufficiently controlled to produce a particular result or that incorporate such variability as to produce individual results that vary in a non-incremental fashion with respect to each other in accordance with multiple measuring criteria. Although the required variation is preferably within certain bounds of measurement, the measured characteristics are preferably free to vary throughout a continuum of values within the certain bounds. The resulting "signature" expressed by the conductivity pattern is preferably acquired as a result of a plurality of measurements covering different regions of the conductivity pattern.

Although the conductivity signature contains random or at least highly variable (i.e., effectively random) elements, the printed pattern of the signature can be similarly random, constant, or encode meaningful information. Preferably, the printed pattern is random or at least highly variable to contribute further uniqueness to the conductivity signature. However, conductivity variations within a constant printed pattern can be used to provide the entire variation of the signatures. Barcode or other symbology can also be used to contribute an orderly variation among signatures while also storing information. Conductivity variations detectable within portions of the signatures or adjacent to the signatures could also encode information.

As a further security enhancement, the conductivity signatures are preferably hidden from view. The conductive ink can be colorless or can be printed in a color that lacks contrast with the surrounding medium. In addition, the conductive ink can be located under other layers that obscure the conductive ink from view. The obscuring layers can be applied as other layers of printing, coatings, or additional substrates. For example, the conductive ink can be applied to substrate and laminated to another substrate of a print medium so that the conductive ink is located between the substrates.

A method of converting printable articles for incorporating individualized signatures in accordance with an embodiment of the invention includes associating a conductive material with a succession of printable articles and variably distributing the conductive material between the printable articles so that the conductive material contributes to the formation of individual conductivity patterns on the printable articles. The conductivity patterns are detectable as unique signatures that differ from each other in an effectively random manner.

Preferably, the conductive material is applied within a printable conductive medium and the conductivity patterns formed by the conductive material within the conductive medium differ between the printable articles beyond the differences in applied patterns of the conductive medium. At least one of the conductive medium and its application is preferably varied between the printable articles. For example, the rheological characteristics of the conductive medium can be varied between the printable articles. The printable articles themselves can be treated in advance of the individual applications of the conductive medium, such as by affecting porosity or surface morphology of the printable articles. The printable articles can also be treated subsequent to the individual applications of the conductive medium, such as by application of heat to the printable articles or embossing the printable articles.

An intermediate layer can be located between the conductive material and the printable article. The intermediate layer can be arranged for varying a distribution of the conductive material. For example, the conductive material can be applied to the printable articles together with an adhesive as well as with an overlying layer. A portion of the individual conductivity patterns can be formed as a reference pattern against which effectively random aspects of the conductivity patterns can be compared. The reference pattern assures that the conductivity patterns are detectable, and the effectively random aspects of the conductivity pattern assure that the conductivity patterns are distinguishable from each other.

Another method of converting print media for incorporating individualized signatures in accordance with the invention includes advancing a web of printable stock along an in-line press and applying a conductive material to the advancing web in a manner that varies along a length of the web. The web is divided into a succession of printable articles. The conductive material contributes to the formation of conductivity patterns that differ between the printable articles in an effectively random manner and are detectable as unique signatures.

The conductive material can be applied to the web within a printable conductive medium by a plurality of print stations that can be operated in or out of synchronism with each other. For example, the plurality of stations can include print rollers that rotate at different speeds so that print patterns applied by the rollers remain out of registration with each other. Concentrations of the conductive material within the conductive medium along with rheological properties of the conductive medium can vary between the stations or over time within individual stations.

The web can be treated in advance of applying the conductive material for further varying the conductivity patterns between the printable articles. The advance treatment of the web preferably varies locally on the web so that the interaction of the conductive material with the web also varies locally on the web. A side-to-side weave can be introduced into the advance of the web for further varying the conductivity patterns between the printable articles. Intervening layers and additional webs can be used to provide opportunities for introducing further variations into the conductivity patterns or to hide or block access to the conductivity patterns.

Media printed with randomized signatures can be incorporated into a security system that detects and records the signatures of the individual media and later detects and compares the later detected signatures with their stored counterparts to verify authenticity of the individual media. Since other layers preferably overlay the signatures, non-contacting detectors are preferred. Capacitive sensors, for example, can detect conductivity signatures.

A method of registering printable articles in accordance with an embodiment of the invention includes associating conductivity patterns with the printable articles so that the conductivity patterns differ between the printable articles in an effectively random manner. Unique signatures are ascertained from the conductivity patterns and recorded so that each of the printable articles is identifiable by the unique signature ascertained from the effectively random conductivity pattern of each printable article.

The printable articles can also be encoded with a unique set of codes, which are preferably visible while the unique signatures are preferably not visible. The unique capacitive signatures of the conductivity patterns can be recorded together with the unique set of codes so that each of the printable articles is identifiable by a combination of the unique code of each printable article and the unique signature ascertained from the effectively random conductivity pattern of each printable article.

The signatures can be recorded in a variety of ways, including as facsimiles, approximations, measures, and other representations. The recordings preferably contain enough information about the signatures to later identify the signatures upon a subsequent detection. Generally, some processing is performed to convert information acquired by the capacitive detectors into information recorded about the signatures. The recorded information is preferably condensed to save storage apace and increase access speeds.

The recorded information about the conductivity signatures reflects not only details of the conductivity signatures themselves but also reflects details of the detectors and the processing used to convert the detected information into a recorded form. As a further security measure, the processing can be used to encrypt the recorded information.

Since the recorded information about the signatures is dependent upon both detection and processing, similar or otherwise compatible detection and processing must be used to recognize the signatures for subsequently authenticating the media. Even if similar detectors and processing are used, the orientation of the individual media to the detectors can also influence the information gathered by the detectors. Accordingly, the detectors should be positioned similarly with respect to the media to obtain similar information about the conductivity signatures upon repeated detection. For example, scanning detectors should track similar paths across the individual media.

Although a database of signatures could be processed by conventional data mining techniques to recognize a later detected signature, the recorded signatures can also be stored with other identifying information about the individual media so that a single signature comparison can be made to validate individual media. For example, the media can be encoded with optical or magnetic information, such as a control number, that is detected and stored with the recorded signature. The encoded information can be redetected and used as a reference for locating the associated recorded signature for making subsequent comparisons.

A method of evaluating the authenticity of printed articles in accordance with another embodiment of the invention includes reading a control code printed on one of the printed articles and detecting a unique signature from the one printed article expressed by a pattern of conductive material that varies in an effectively random manner between the printed articles. A database is consulted that stores signature information together with control code information for identifying the signature information associated with the control code of the one printed article. The detected unique signature from the one printed article is compared with the signature information stored in the database associated with the same control code for evaluating the authenticity of the one printed article.

The signature can occupy a single region of the individual media or can be distributed throughout multiple regions. Preferably, the signature is laid out so that it can be scanned along a single line. Reference marks or features (e.g., edges) of the media itself can be used to locate the signature on the media. Starting and stopping points can be referenced for detecting a predetermined portion of the signature.

A system for identifying conductivity signatures of printable articles in accordance with another embodiment of the invention includes a capacitive sensor arranged for measuring conductivity patterns appearing on printable articles. Each of the conductivity patterns that appear on individual printable articles differs from the conductivity patterns that appear on other of the printable articles. The conductivity patterns have conductivity characteristics that vary over a continuum. The capacitive sensor is arranged for making capacitive coupling measurements of the conductivity patterns over multiple regions of each of the conductivity patterns for acquiring a data set for each of the conductivity patterns. The data set includes measures of conductivity characteristics in the multiple regions for defining a unique signature associated with each of the printable articles.

The multiple regions can be contiguous regions for measuring conductivity characteristics of the conductivity patterns throughout a common expanse. A database can be used to store representations of the unique signatures for identifying the printable articles. A reader can be used for acquiring control codes from the printable articles, and the control codes can be associated with the unique signatures in the database for further identifying the individual printable articles. A processor can be used to access the database through the control codes for comparing representations of the unique signatures acquired from the capacitive sensor with the representations of unique signatures associated with the same control codes in the database.

A transporter can be used to relatively convey the printable articles past the capacitive sensor, which can be further arranged for making capacitive coupling measurements of the conductivity characteristics as a function of position on the substrate for acquiring an analog signature of the conductivity patterns.

BRIEF DESCRIPTION OF THE SEVERAL VIEWS OF THE DRAWING(S)

Figure 6:
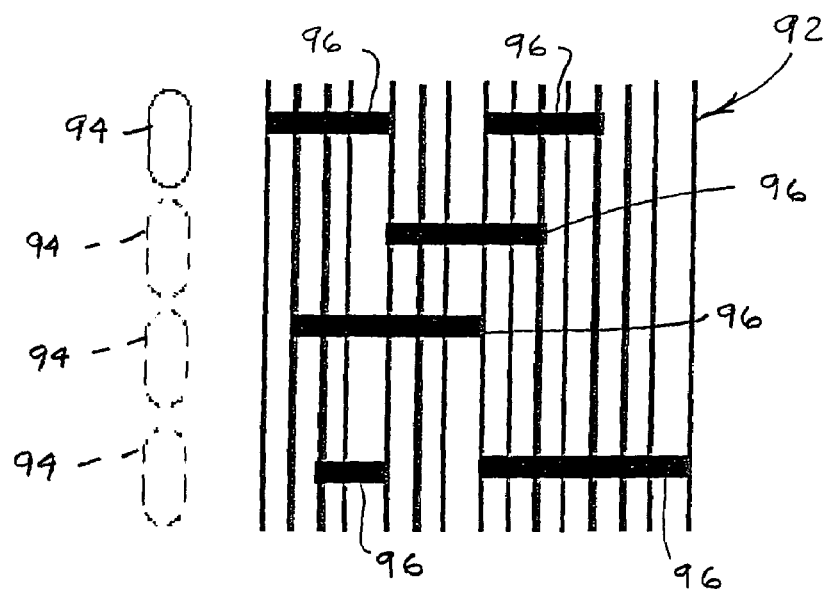
FIG. 6 shows a modification of the barcode pattern of FIG. 5 with the addition of crossbars that provide a base level of conductivity.
Figure 7:
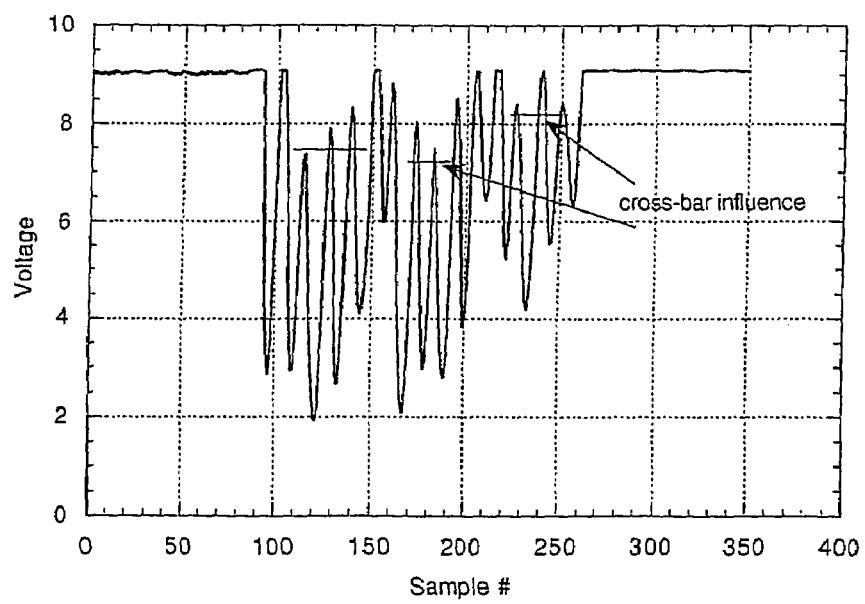

FIG. 7 contains a plot of data acquired by the sensor for the barcode pattern shown in FIG. 6.

Figure 8:
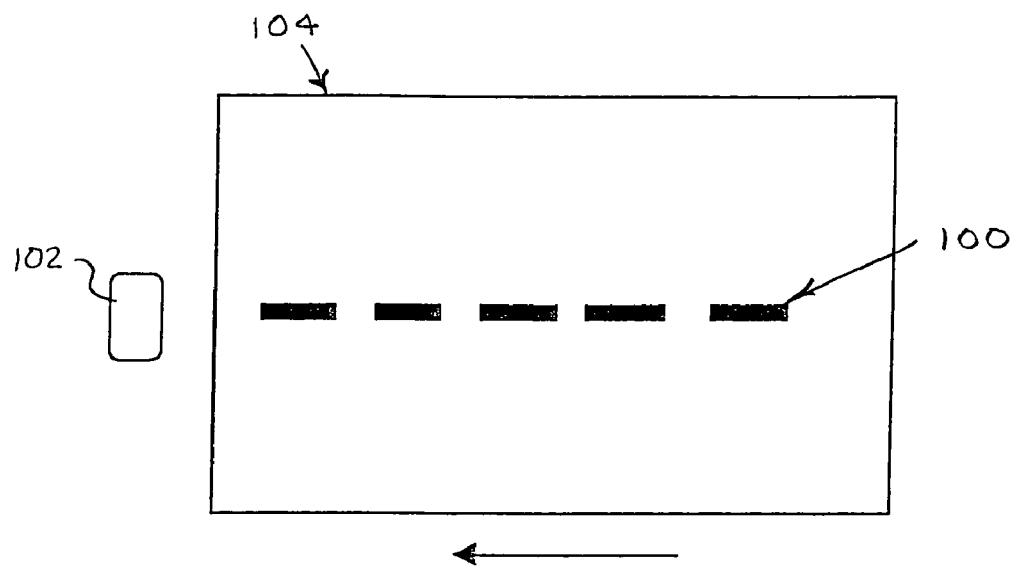

FIG. 8 shows a printed pattern on an article having a width well within a corresponding dimension of a sensor.

Figure 9:
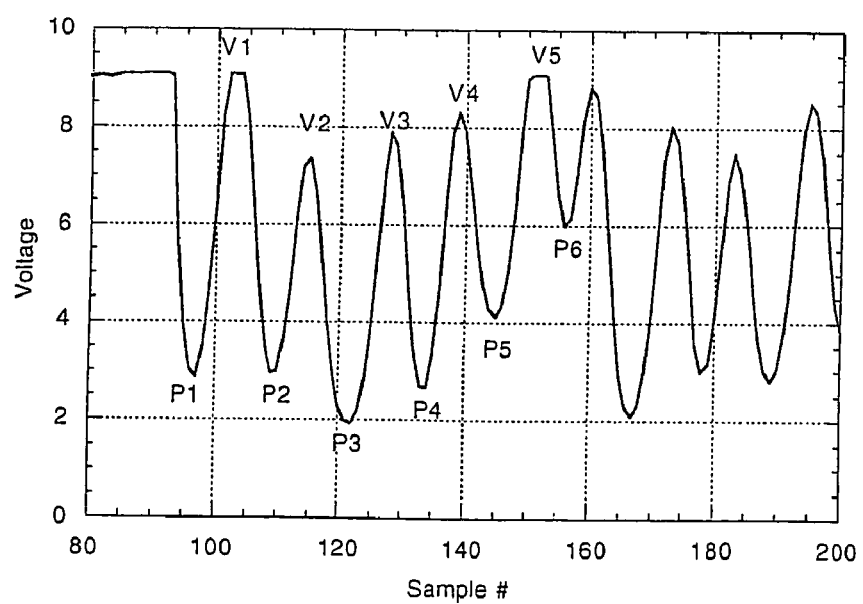

FIG. 9 contains a plot of a variable intensity profile identifiable as a succession of peaks and troughs.

Figure 10:
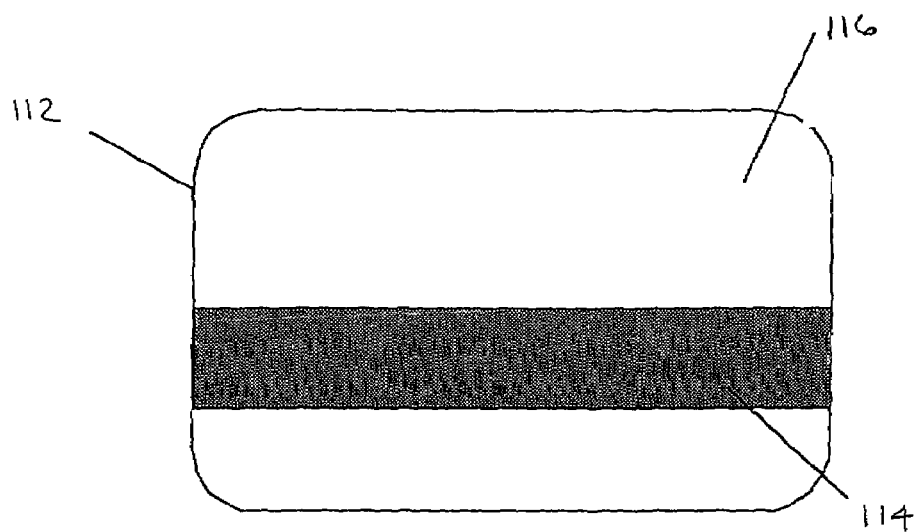

FIG. 10 is a back view of a magnetically striped card containing an effectively random conductivity pattern.

Figure 11:
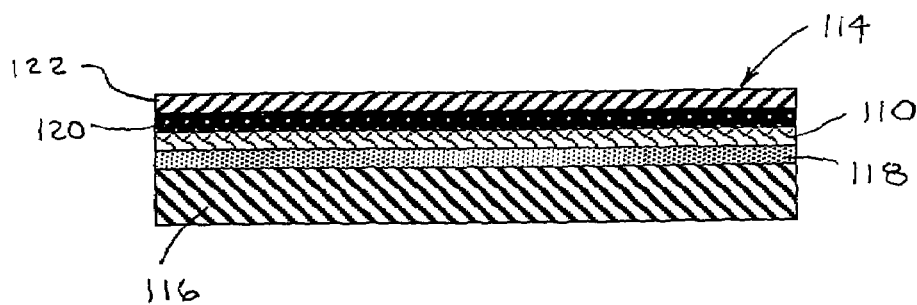

FIG. 11 is cross-sectional view of the card of FIG. 10 showing its constituent layers.

Figure 12:
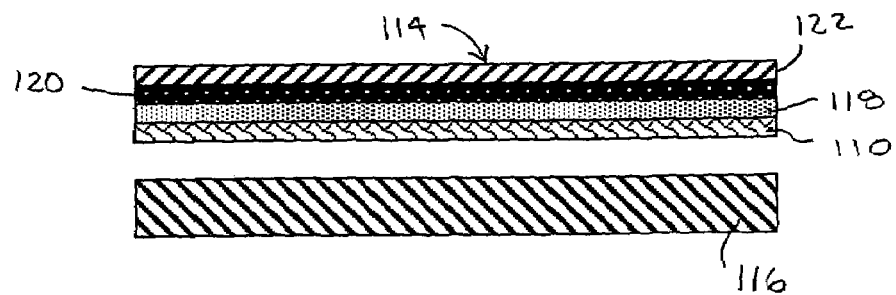

FIG. 12 is a similar cross-sectional view showing another combination of layers prior to lamination.

Figure 13:
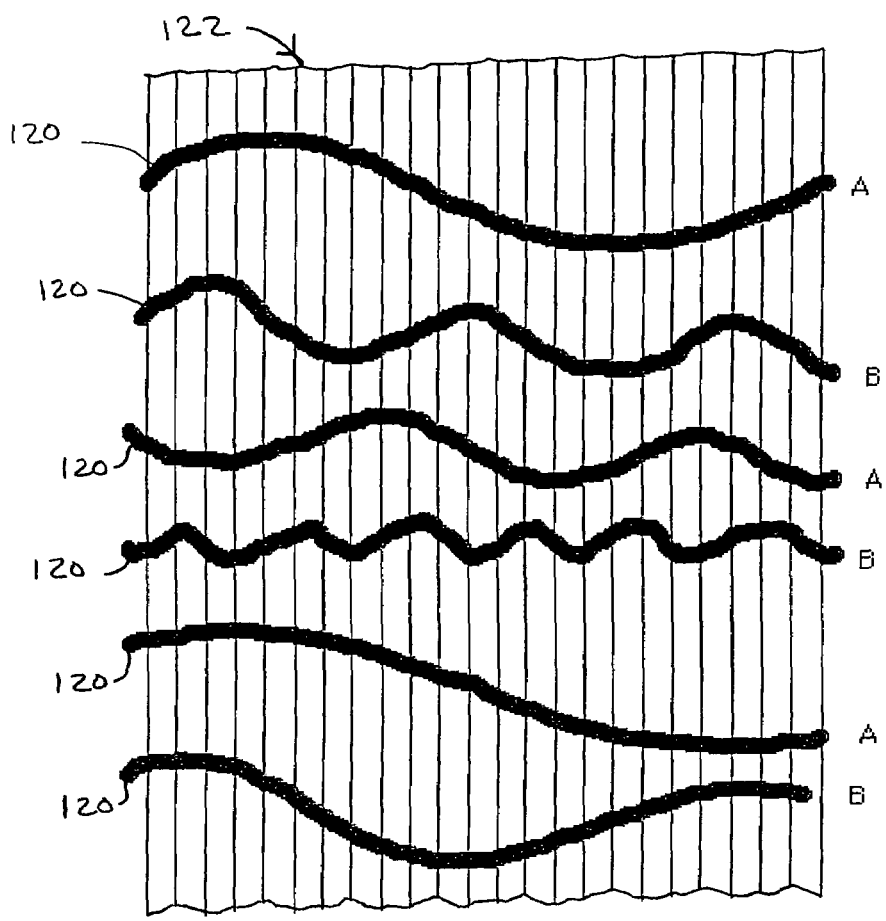

FIG. 13 shows a section of a web intended for longitudinal division into magnetic stripes and printed with wave-like patterns of conductive ink.

Figure 14A:
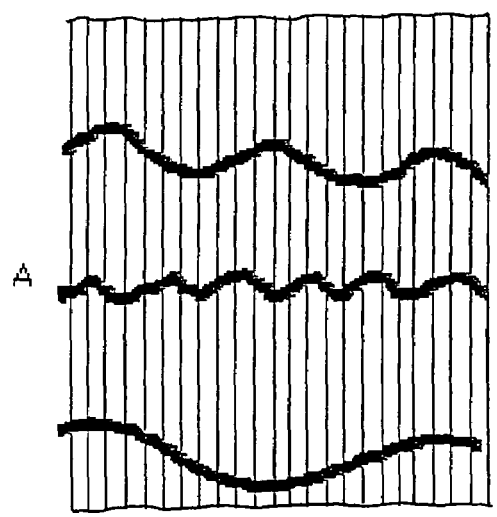
Figure 14B:
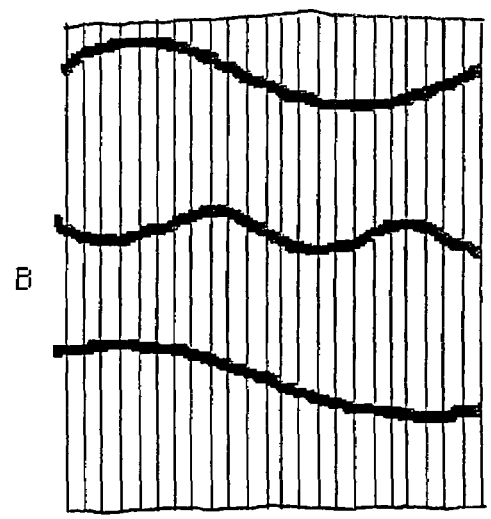
Figure 15A:
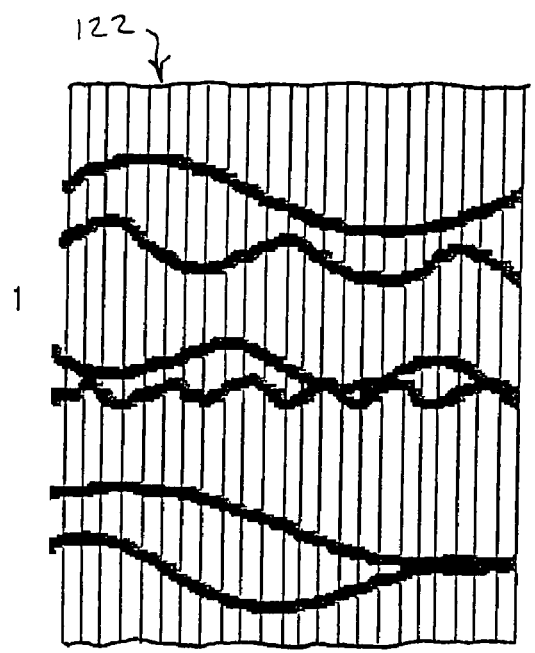
Figure 15B:
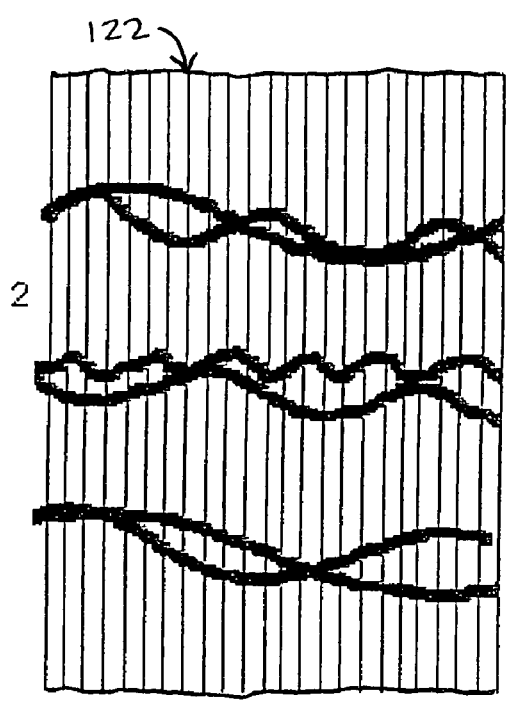
Figure 15C:
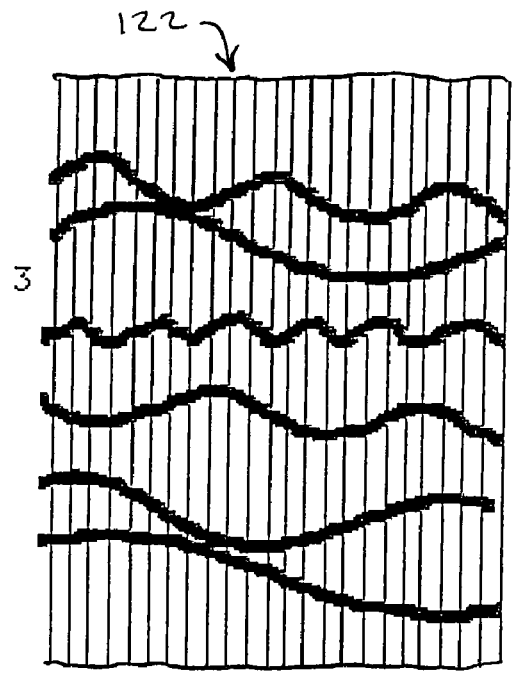
Figure 15D:
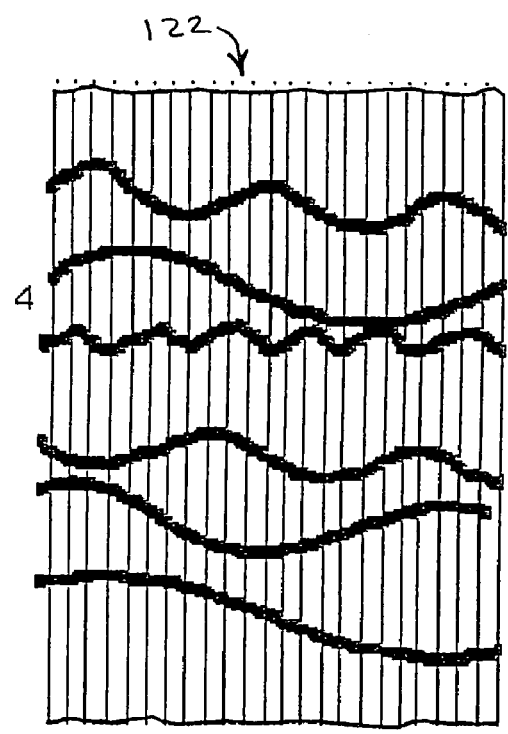

FIGS. 14A and 14B show two different patterns that can be laid down by separate printing rollers.

FIGS. 15A–15D illustrate the variability of applying the different patterns to the web out of registration with each other.

Figure 16:
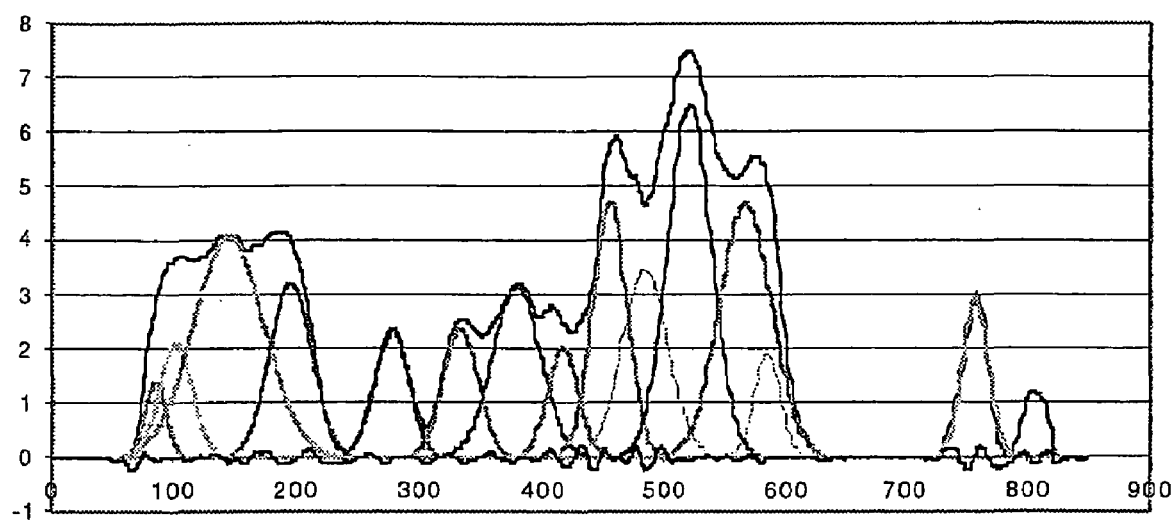

FIG. 16 illustrates a conventional Gaussian fitting technique for mathematically representing the detected patterns of conductive variation.

DETAILED DESCRIPTION OF THE INVENTION

The invention addresses a need for uniquely identifying print media, particularly as to its origins or authenticity. A wide variety of print media are contemplated for the invention, which can vary in material composition, form, and configuration—all of which can be exploited in accordance with the invention for contributing to the variability of unique signatures for identifying individual printable articles.

Figure 1:
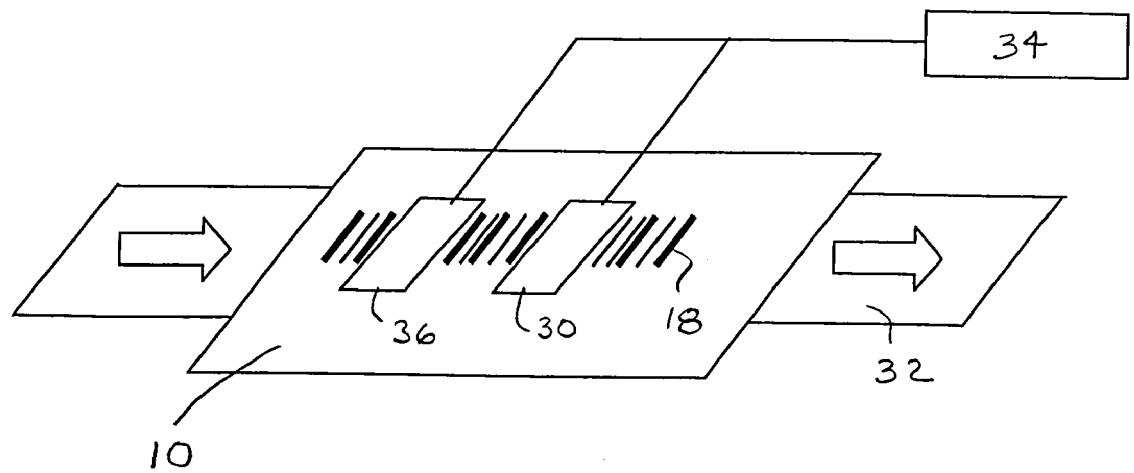
FIG. 1 is a perspective view of a printable article in the form of a ticket being transported past a pair of sensors.
Figure 2:
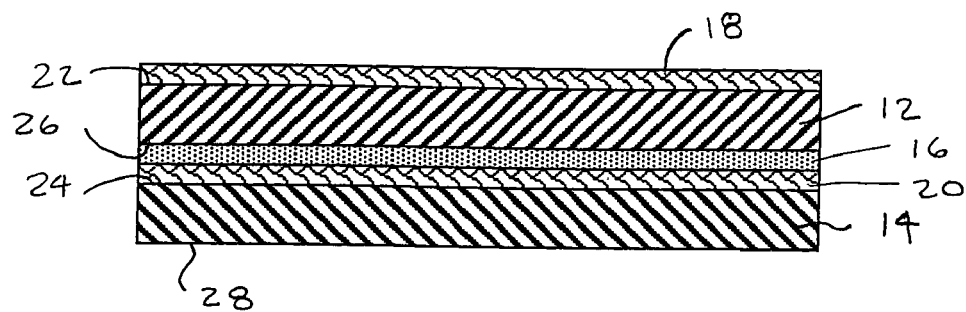
FIG. 2 is a cross-sectional view of the ticket shown in FIG. 1 with the layers enlarged for easier identification.

By way of example, a laminated ticket 10, as shown in FIGS. 1 and 2, is manufactured so that one or more of a plurality of substrates 12 and 14 are printed with patterns 18 and 20 using an electrically conductive medium, such as an electrically conductive ink. Upon lamination of the substrates 12 and 14 together through a layer of adhesive 16, the patterns 18 and 20 are distributed through the thickness of the ticket 10.

Although the printed patterns 18 and 20 are shown printed on top surfaces 22 and 24 of the two substrates 12 and 14, the printed patterns 18 and 20 could also be printed on bottom surfaces 26 and 28 of the substrates 12 and 14. In addition, the printed patterns 18 and 20 can be printed directly on the substrates 12 and 14 as shown, or the printed patterns 18 and 20 can be printed on one or more intervening layers, such as on the adhesive layer 16.

The substrates 12 and 14 can be made from a variety of materials and can take a variety of forms, particularly with respect to variations in thickness and peripheral dimensions. The material composition of the substrates 12 and 14, which includes both papers and plastics, is determined largely by the requirements of end use. Within the material constraints of the intended end use, the invention provides for exploiting the material properties for purposes of contributing to the further variability of conductive signatures arising from the interaction of the conductive medium and the substrates 12 and 14 together with any intervening layers.

The electrically conductive ink for printing the patterns 18 and 20 can be a carbon or carbon/graphite based ink.

However, other conductive additives such as silver or indium tin oxide (ITO) could also be used. The layer of adhesive 16 can be formed from a variety of adhesives chosen according to conventional practices for bonding the substrates 12 and 14. Such adhesives include rubber adhesives, polyvinyl acetates, hot-melts, and pressure-sensitive adhesives as well a variety of adhesives subject to a particular curing mechanisms. Conductive adhesives in various formulations can be used to contribute further variability among the conductivity patterns and can also be used in place of the conductive ink to form the printed patterns 18 and 20 themselves.

A capacitive sensor 30 is used to detect the presence of a resultant conductivity pattern by passing the ticket 10 past the capacitive sensor 30 on a transporter 32 and recording the results. The strength of the signal recorded by the sensor 30 depends upon, among other things, the distance of any given printed pattern 18 or 20 from the sensor 30. For a laminated ticket, such as the ticket 10, this allows the sensor response to be determined not only by a lateral distribution of the printed patterns 18 and 20 over the printed surfaces 22 and 24, but also by their depth within the laminated structure of the ticket 10. When the ticket 10 is passed by the capacitive sensor 30 (either by mechanical automation or by hand), a signal profile is produced that contains contributions from the printed patterns 18 and 20 located at different depths throughout the laminated structure. Each of the printed patterns 18 and 20 has a different amplitude that depends on the depth of the printed pattern in the laminate.

The resulting pattern of conductivity can be spread over the printed surfaces and through the depth of the laminated ticket 10. Even within the visible representations of the printed patterns 18 and 20, conductivity varies with local concentrations of the conductive medium or with concentrations of conductive materials within the conductive medium. The conductivity variations also depend upon the characteristics of the substrates 12 and 14 on which the conductive medium is printed. The substrates 12 and 14 can be modified in advance of printing the patterns 18 or 20 to vary their local characteristics, such as porosity or surface morphology. Subsequent processing, such as heating, etching, or other application of kinetic energy, can be used to produce additional conductivity variations.

The printed patterns 18 and 20, in and of themselves, can be meaningless, representing only the results of applying a printable conductive medium to the substrates 14 and 16 in a varying form. Alternatively, either of the printed patterns 18 and 20 can encode meaningful information, such as barcode or other symbology that carries an identifying code. For example, the printed pattern 18 has the form of a barcode, whereas the printed pattern 20 has no meaningful form. The capacitive sensor 30 can detect local conductivity variations (i.e., capacitive amplitude variations) of the patterns 18 and 20, which can be used separately or in combination with the encoded meaningful information as defining the "signature" of the ticket 10. This signature can be stored in a database 34 for future reference.

Examples of such capacitive sensors are described U.S. Pat. No. 6,168,080 to Verschuur et al. entitled Capacitive Method and Apparatus for Accessing Contents of Envelopes and Other Similarly Concealed Information and in U.S. Pat. No. 6,202,929 to Verschuur et al. entitled Capacitive Method and Apparatus for Accessing Information Encoded by a Differentially Conductive Pattern, which are both hereby incorporated by reference. The patents describe capacitive sensor systems for reading hidden barcode information inside sealed, opaque envelopes. Here a document, ticket, card, or other printable article in which the conductivity pattern can be hidden by a nonconductive, opaque layer or another substrate can replace the envelope. The conductivity pattern can be printed on a single face of a single substrate or can be printed on single or multiple faces of a plurality of substrates for spreading the conductivity pattern across and through multiple layers of an article.

The collective conductivity pattern associated with the two printed patterns 18 and 20 of the ticket 10, whether regarded as containing meaningful information (e.g., a barcode) or not, serves as a permanent record of that ticket's signature and can be combined with other security features or systems to verify the authenticity of the ticket 10. For example, the capacitive sensor 30 within a gaming machine (not shown) can be used as a part of an identification system to detect and record the conductivity signature just prior to dispensing the ticket 10. The signature record can be stored together with other information identifying the ticket 10 in the database 34.

The ticket 10 can be later reinserted into the gaming machine for further use or into a cash-out machine (also not shown) for redemption. The ticket's conductivity signature can be again detected by the same or a similar capacitive sensor 30 and compared with the database 34 via a computer or other processing arrangement (not shown). If no match is found, the ticket is deemed to be counterfeit.

A counterfeit ticket cannot readily be made to identically match the conductivity signature embodied within the ticket 10 for several reasons. Because the ticket 10 is laminated and one of its two printed patterns 18 and 20 (i.e., 20) is hidden between substrates 12 and 14, the collective conductivity signature is not readily viewable or accessible to be counterfeited or tampered with. Alternatively, either or both of the printed patterns 18 and 20 can be hidden between other layers or covered by an opaque layer of ink to render the printed patterns 18 and 20 entirely invisible on the ticket 10. In addition, the conductive medium itself can be invisible (e.g., an invisible ink).

In any attempt to replicate the conductivity signature, the counterfeiter would have to determine the detailed conductivity structure of the signature as well as any information content encoded by the signature. Duplicating the printed patterns 18 and 20 would be difficult; duplicating the conductivity variations within the printed patterns 18 and 20 would be even more difficult. Information gleaned about the conductivity structure of the signature varies depending upon the type of detector used and its relationship to the ticket 10. Differences in either can adversely affect information acquired about the conductivity structure. Even if sufficient knowledge were acquired about the conductivity structure, intentionally printing an equivalent random conductivity pattern adds more difficulty. A different random conductivity pattern is preferably applied to each of the other tickets, compounding the task of more widespread counterfeiting.

Figure 3:
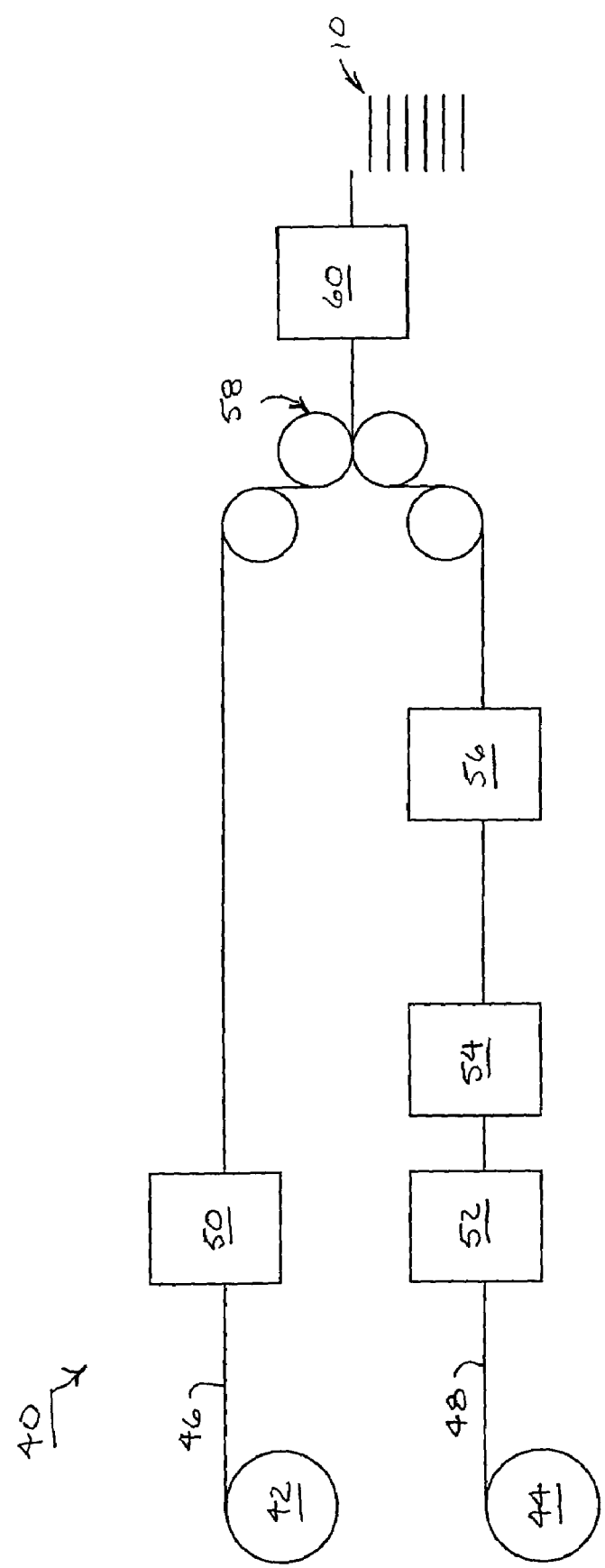
FIG. 3 is a diagram of a web press for both making a succession of tickets and applying effectively random conductivity patterns to the succession of the tickets.

Variability in the patterns of conductivity can be introduced during manufacture of the tickets 10 in a variety of ways. For example, on a web press 40 for producing a succession of the tickets 10 as shown in FIG. 3, the variability can be introduced both intentionally and as a result of the net effect of one or more uncontrolled variables in the manufacturing process.

After being unrolled from separate supply rolls 42 and 44, webs 46 and 48, which form the substrates 12 and 14, pass by one or more print stations 50, 52, and 54. An electrically conductive medium, such as an electrically conductive ink, can be applied by various printing technologies at the stations 50, 52, and 54 including digital, transfer, stencil, and printing press/plate technologies. Spray-on and other dispensing techniques can also be used as suitable for applying the conductive medium. Both positive and negative imaging can be used, such as by processes that remove or otherwise disturb a conductive layer. Although electrostatic printing methods are generally not preferred for applying conductive inks, non-conductive inks can be electrostatically printed under or over the conductive inks to vary the resulting conductivity patterns. For example, the non-conductive ink can be pre-applied to one or more of the webs 46 or 48 to vary the porosity of a surface of the web. The local conductivity of the applied conductive ink varies with the porosity of the substrate. Predetermined or random variations of the webs 46 and 48 including variations in texture, porosity, and adhesion can be used to further influence the conductivity patterns.

The conductivity of the printed patterns 18 or 20 also depends upon the thickness of the printed conductive medium and on the concentration and strength of conductive material in the conductive medium. For example, when a conductive ink bath is topped off with fresh ink, the conductivity of the dried print will vary during a press run. An analox roller can control the density of a conductive ink, for example, and by suitable etching of the roller, the thickness of applied ink can be made to vary. Since the conductivity of the ink, and hence the capacitance presented by any given area of ink, depends upon the thickness of the layer, this introduces a variable of the collective conductivity pattern. Small random variations in conductivity can be found even across the width of a wide printed bar or square of conductive ink. This is believed to be a consequence of ink wicking along a substrate (e.g., paper) toward the edge of the pattern due to a complex interaction between surface tension, osmosis, and gravity.

Further variability can be introduced by having the multiple stations 52 and 54 running rollers of slightly different diameters at speeds to keep them in synchronism with the web 48 to produce a complex interference pattern. Web press tolerances can also be loosened to permit a side-to-side weave of the web during the application of the conductive ink. Considering the variability between the printed patterns themselves, the changing composition of the conductive ink, and intentional or inherent variations in the surface of the webs 46 and 48, and the different levels on which the patterns are printed, the resulting variations in the conductivity patterns become very complex.

Subsequent processing, such as etching, embossing, or heating can further distinguish one conductivity pattern from another. Etching can be used to remove portions of the conductive ink or otherwise treat the printed surfaces. Embossing can further affect the displacement of the conductive materials in a depth direction normal to the surfaces of the webs 46 and 48. Heating can be used separately or together with intervening layers sensitive to heat to redistribute the conductive materials across or within the layers of the webs 46 and 48. For example, heat can be used to affect the form or dispersion characteristics of an intervening layer such a layer of adhesive, supporting one or more of the printed patterns 18 and 20.

Following the printing operations of the press 40, an applicator station 56 applies a layer of adhesive and laminator 58 joins the two webs 46 and 48 together. Alternatively, the adhesive applicator station 56 could be positioned in advance of one of one or both of the printing stations 52 and 54, especially if the electrically conductive ink is applied to the adhesive layer 16. In addition, an adhesive could be pre-applied to one of the other of the webs 46 and 48.

A diecut station 60 divides the laminated webs 46 and 48 (laterally and/or transversely) into a succession of the tickets 10 each having a distinctly different conductivity pattern that defines a unique signature. Generally, the variations within the conductivity patterns are effectively random and timed out of registration with the division into the tickets 10. However, especially if the conductivity patterns also encode meaningful information, the conductivity patterns can be located within prescribed areas of the tickets 10 (i.e., in overall registration with the division into individual tickets or other printable articles).

Prior to being placed in circulation, the tickets 10 are preferably read for recording their signatures into the database 34. Although the signatures could be read on the press 40, the signatures are preferably read just prior to their distribution so that the signature data is only stored for tickets in circulation or after a further association is made with the tickets, such as the identity of the distributor is established or control codes of the tickets are assigned. This limits database size.

In the current example, the ticket 10 is preferably read either by another gaming machine or by a cash-out reader for detecting its unique signature. Although the capacitive signature is derived from effectively random conductivity characteristics, the conductivity pattern can also encode additional information, such as information unique to a casino or other distributor in the form of a visible barcode or other symbology that can be decoded for further identifying the ticket 10. Alternatively, the additional information can be encoded separately from the conductivity pattern, such as by printing the code in a visible pattern or by writing the code on a magnetic stripe. The additional information, which can be acquired by a separate reader 36 (see FIG. 1), can be stored together with the unique signatures in the database 34, so that the signatures can be more readily accessed through the additional information that identifies ticket 10 in the database 34. For example, the additional information, such as an identification code, can take less storage space that the signatures themselves, and thus, are more readily searchable.

When the ticket 10 is presented for redemption, the unique ticket signature and any encoded information it also represents along with any visual, magnetic, or other identifying data extractable from the ticket can be compared with information in the database. Should the information extracted from the ticket upon redemption not match the information detected or otherwise assigned upon dispensing, counterfeiting or ticket tampering has been detected. In making the comparison, the identifying data can be used to locate the corresponding signature in the data base, so that a comparison between just two signatures is required—the signature read from the presented ticket 10 and the signature stored in the database 34 from a previous reading of the ticket 10.

Figure 4:
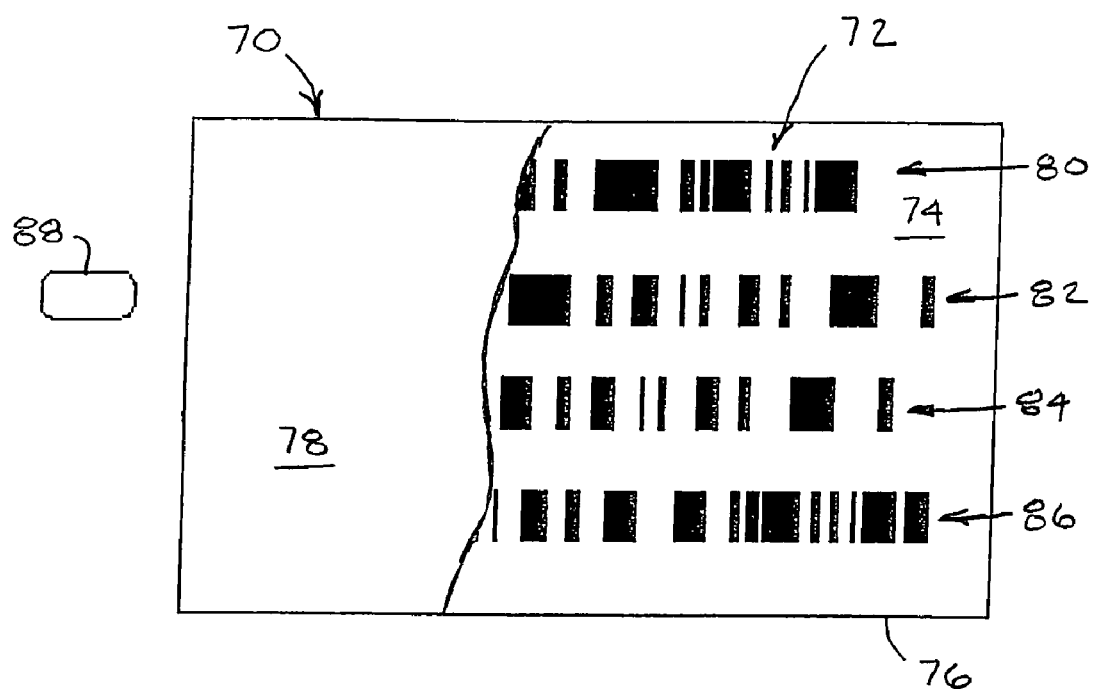
FIG. 4 is a plan view of a single-ply printable article printed with a conductivity pattern occupying most of the article's transverse area.

In another embodiment shown in FIG. 4, instead of a laminated structure, a printable article 70 has a meaningful or meaningless printed pattern 72, which is shown printed on just a top surface 74 of a single-ply structure 76 using conductive ink (e.g., a carbon based ink). The same or another printed pattern could also be printed on a bottom surface of the single-ply structure or on one or more intervening layers supported on one or both surfaces of the single-ply structure 76. A layer of non-conductive ink 78 covers the printed pattern 72 to hide it from view. Other layers, coatings, or substrates can also be used to hide and protect the conductivity pattern 72. For example, part or all of the conductivity pattern 72 could be applied beneath a signature block.

Several levels of complexity in encoding the conductive signatures are possible. In this embodiment, wide and narrow bars in two dimensions, apparent as different size squares or rectangles, are be distributed across the printable article 70. Upon presentation for redemption, this pattern 72 is scanned along some axis, which may be set to any one of several axes from machine to machine. A master computer/database can know which axis the pattern 72 was scanned. The counterfeiter would not know and would have the even more tedious job of duplicating the entire pattern 72 in order to make sure that the desired profile is duplicated.

To duplicate the entire conductivity pattern 72, the counterfeiter would need to map the entire capacitive structure of the pattern 72 to assure that the necessary pattern recorded in the system was duplicated. Even if ink of the correct conductive properties were obtained, duplicating the pattern would be exceedingly difficult, because among other reasons the conductivity of the ink can vary over periods of days as it dries out. The counterfeiter would need to be able to duplicate a pattern of conductivity in detail, and be sure that it maintains that pattern over time. Matching the original conductivity pattern would require an iterative process of refinement involving, measuring, aging, and refining the conductivity pattern. This quickly creates diminishing returns for a great deal of labor.

The printed pattern 72 is divided into rows 80, 82, 84, and 86. One of the rows, such as the row 80, can be used to encode information in a conductive format that identifies the printed article, as well as other information concerning the source or use of the printed article 70. The other rows 82, 84, and 86 can encode additional information or express effectively random patterns of conductivity for defining unique signatures. While all of the rows 80, 82, 84, and 86 can be read, this would require multiple sensors or multiple readings. Our preference is for just one of the rows to be read upon dispensing by a single capacitive sensor 88 for acquiring the conductive signature, but different ones of the rows could be read at different times or locations. For example, the four rows 80, 82, 84, and 86 could be four codes each pertaining to a different distributor or user, which is separately read and decoded according to where the capacitive sensor 88 is located in a given machine.

Figure 5:
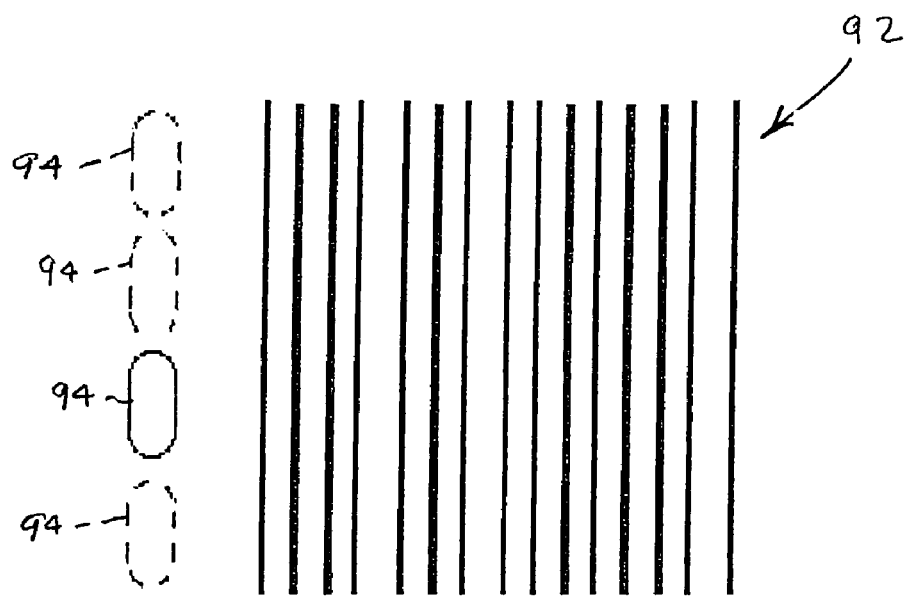
FIG. 5 is a depiction of a barcode pattern presented to a sensor having bar heights that exceed the size of the sensor.

An alternative printed pattern 92 shown in FIG. 5 takes the form of a single hidden barcode containing information that can be decoded by the sensor algorithm. The barcode symbology can be presented in several ways. FIG. 5 shows an exemplary broad barcode and four of the possible locations for a capacitive sensor 94. The sensor 94 relatively traverses the length of the barcode to correctly identify the encoded information. Because the conductivity can be made to vary along the height of the bars, and across the length of the code, the resulting profile of the barcode will depend upon the axis along which the sensor scans the printed pattern 92.

A further variation of the printed pattern 92 is shown in FIG. 6, where crossbars 96 have been added as points of reference. When the sensor 94 moves across a region of the code where a crossbar is located, a signal in addition to that produced by the vertical bars is detected. This means that the minima in the profile between bar signals will not drop to zero but will instead depend on the widths of the crossbars and their location with respect to the length of the linear sensor.

The barcode pattern itself exhibits a unique conductance (hence capacitance) signature (or profile) superimposed on "background" signals produced by the crossbars, which produce their own conductance (or capacitance) signals. A counterfeiter cannot readily detect these crossbars 96 without destroying the laminate and therefore will not be able to readily mimic the changing background levels introduced between the bar profiles in a counterfeit.

Examples of the types of signals seen with and without crossbars on the same bar pattern are shown in a diagram of FIG. 7. Signals due to the bars do not reach the baseline level of 9V where the sensor intersected a crossbar 96 in the barcode pattern.

A conductivity pattern laid out within and along a printed pattern 100 as single thin line is shown in FIG. 8. Preferably, the thin line 100 is oriented to the direction of printing so that it sustains the greatest variation in conductivity and is broken to provide a baseline for contrast. The thin line 100 is thinner than the width of a capacitive sensor 102 for detecting its conductivity variations with position, to render the resulting signature less sensitive to issues of registration and alignment with the sensor 102 between readings associated with its original detection and subsequent verification.

The signature line 100 can be printed in a predetermined repeating pattern to provide a further baseline for comparison and to assure that the entire signature line has been read. In addition to the possibility of hiding the printed line 100 between laminated layers that comprise the base structure of an article 104 or beneath layers of inks (or other coatings), the line 100 can be printed beneath other features such as magnetic stripes, signature blocks, or holograms.

A variable intensity profile as may be acquired from a capacitive sensor can be used both to encode information and to define the signature of a given printable article. For example, a ticket dispensed by a slot machine at Casino 12345 can have a hidden barcode, printed with conductive ink and interpreted as 12345 when passed by the capacitive sensor. However, the amplitude of the individual bar elements can vary from bar to bar to define the ticket's unique signature. Thus, the capacitive sensor in addition to reading the casino identifier can also contribute to recording a unique series of peaks and valleys as the signature of the ticket.

The diagram of FIG. 9 illustrates the recording of such a pattern. The relative heights of a sequence of peaks (P1, P2, P3 . . . ) and valleys (V1, V2, V3 . . . ) can be used to define the signature of the ticket. The relative widths of the peaks and their relative locations with respect to one another can be used to determine the information encoded in the printed pattern. The relative amplitudes of a succession peaks and valleys can be used to define the ticket's "signature". The signal produced by the capacitive sensor is determined not only by the conductivity pattern being sensed but also by the workings, position, orientation, and relative motion of the capacitive sensor itself. Different sensors and different sensor operations can produce differing results.

A barcode algorithm can be used to compare the widths of the signals as a function of position to determine the information embedded in the printed pattern. Such algorithms are well known to those versed in the art. In addition, however, information on the full amplitude profile, or alternatively, the amplitude of a succession peaks and valleys in the code profile can be stored as a signature for future reference.

Alternatively, the conductivity pattern in or on the printed articles can produce a unique signature without encoding other information. The conductivity pattern could still be akin to a barcode in some sense, except that it carries no intrinsic information other than that assigned to it upon being dispensed for the first time. The conductivity pattern does, however, provide a basis for extracting the unique "fingerprint" or signature of that article. The signature can be read for the first time when the printable article is issued or otherwise distributed and once again when the printable article is presented for redemption or validation.

One method for encoding the amplitude profile data would be to calculate its frequency profile (Fourier transform) and store the profile as a series of Fourier coefficients. When the same printable article is later presented for redemption, the Fourier coefficients can be cross-correlated with the set in the database to determine if the signature is genuine. Alternatively, the raw amplitude profile can be cross-correlated between its two versions in a computer. A criterion can be established (by tests) that sets the magnitude of the cross-correlation coefficient that establishes identity. A similar cross-correlation of the amplitudes of a sequence of peaks and valleys could attain the same end very quickly.

The profiles of the measured conductivity patterns can be recorded and reduced to several numbers describing the patterns, or all or a portion of the profiles can be stored for later comparison with the signature of the tickets presented for redemption. For example, a number system can be used to indicate the relative location of peaks in the capacitance signal, the relative amplitude of the signal, degree of slope on the rising and falling side of the signal, and a number to indicate the slope across the peak. Other methods include storing the amplitude data as a set of numbers characterizing the values of the peaks and the valleys and cross-correlating the pattern between the two reads of the ticket signature. Another way would be to record the Fourier coefficients for the entire bar shape, even in the case of a single wide bar, so as to accentuate random variations in conductance, and compare their values between the two reads. Even simple bars printed with conductive ink can produce unique conductivity patterns when read by a sensor of sufficiently high resolution.

If either a Fourier transform or a cross-correlation were to be used, a stable time base is helpful to remove the unknown variable produced by small speed differences between the printed articles and the sensors during the different reads. For example, a time base can be introduced into the printable article or into the printed pattern of the article such as a uniform set of bars or other timing indicia. Conventional mathematical processing can also be used to eliminate such systematic errors. The bars of a barcode or other identifiers could be used as timing markers.

In the illustrated embodiment of FIGS. 10 and 11, a conductivity pattern in the form of a printed pattern 110 of conductive ink is applied to a magnetically striped card 112. The pattern 110 of conductive ink is preferably printed onto a magnetic stripe 114 and laminated together with a cardstock 116 using a layer of adhesive 118 so that the conductivity pattern is hidden and protected between the magnetic stripe 114 and the card stock 116. The adhesive can be any of a number of adhesive types, which can be selected in accordance with conventional practices for bonding different surfaces.

A dispersion of conductive material within a magnetic material layer 120 of the magnetic stripe 114 can slightly dilute the capacitance signal from an underlying conductivity pattern, but this dilution is not sufficient to actually obscure the signal. In fact, any conductive features associated with the dispersion of conductive material within the magnetic layer 120 of the stripe can be incorporated into the recorded signature signal. The magnetic stripe 114 can also be regarded as but one example of a substrate that can itself incorporate a random conductivity to add further variability between the conductivity patterns of different cards or other printable articles.

In addition, the magnetic stripe 114 can be used to store other uniquely identifying information about the cards and to provide reference marks for locating starting and stopping points for reading the conductivity pattern. The leading edge of the card 112 can also be used as a point of reference along with an encoder wheel that measures distances across the card. Reference points beyond starting and stopping points can be used to further divide the signature detection interval to accommodate processing variations such as speed.

The magnetic stripe 114 is formed by a film 122 together with the layer of magnetic material 120 carried on the film 122. However, the magnetic material layer 120 could also be transferred onto the card stock 116 independently of the film 122 from another carrier, such as by transfer printing. The printed pattern 110, which can be part of a larger printed pattern, can be printed on a back surface of the magnetic stripe 114 or on a front surface of the card stock 116 prior to the assembly of the magnetic stripe 114 together with its underlying card stock 116. Similarly, the layer of adhesive 118 can be initially applied to either the magnetic stripe 114 or to the card stock 116. In either case, the printed pattern 110 can be applied over or under the layer of adhesive 118. The printed pattern 110 or an additional printed pattern could be printed on either surface of the film 122 and on either side of the magnetic material layer 120.

For example, FIG. 12 shows a rearrangement of the layers of FIGS. 10 and 11 just prior to lamination in which the printed pattern 110 is applied to the adhesive layer 118 carried on the magnetic stripe 114. The conductive printing ink of the printed pattern 110 can be effectively subsumed into the adhesive layer 118 upon activation of the adhesive during lamination and does not significantly interfere with the bonding process. The application and any curing steps involved with the activation of the adhesive layer 118 are also opportunities for increasing the variability between conductivity patterns on different ones of the laminated cards. In addition, another substrate, coating, or transferable material, such as thermally transferable ink, can be substituted for the magnetic stripe 114 to provide an alternative cover or carrier for the printed pattern 110.

Magnetic stripes, such as the magnetic stripe 114, intended for lamination to a conventional card stock, such as the card stock 116, are generally cut from a master roll, such as a 33 centimeter (13 inch) wide roll. The roll is slit lengthwise into approximately 1.27-centimeter (0.5-inch) magnetic stripes and the resulting rolls are cut transversely to the desired length of the magnetic stripes. However, before the magnetic roll is cut, conductive ink patterns can be printed onto the master roll.

FIG. 13 shows wavelike patterns 120 of conductive ink that can be printed across a web 122 in a highly variable pattern of sufficient density that the wavelike lines repeatedly cross the web within the expected length of a magnetic stripe 114. The principle variation produced by the wavelike lines is along the length of the magnetic stripes, which renders the signature less sensitive to lateral offsets from the sensors. The illustrated pattern is produced by two printing plates that lay down the separate patterns shown in FIGS. 14A and 14B and that operate at different repetition frequencies so that the same combined pattern of wavelike lines does not readily repeat. The two roller plates print separate patterns designated as "A" and "B" in FIG. 13.

When the web 122 is run, the two patterns A and B shift with respect to each other creating combinations such as found in FIGS. 15A–15D. Additional pattern variations are possible by allowing a transverse motion between the web 122 and the two roller plates. For example, guides (not shown) along the web 122 can be moved or removed to permit such variation. The accumulation of such variation can produce a series of signature patterns whose likelihood of repeating quickly becomes an intractable mathematical problem. Even more variability is introduced by the slicing and cutting of the web 122 into the desired width and length stripes, which are preferably cut out of registration with the printing operations.

However, even if the signature patterns were repeatable among a large number of cards or other printable articles, the odds of finding such a card among the other cards with a limited number of attempts is remote. Moreover, the actual conductivity pattern preferably depends upon much more than the printed patterns themselves. Variations in the ink or in a treated surface of the web 122 further distinguish the conductivity signature from its visible manifestation.

Preferably, the detection system includes a capacitive sensor and a media transporter (such as the capacitive sensor 30 and media transporter 32 shown in FIG. 1) for relatively moving the media with respect to the sensor to scan a pathway across the media. Each relative position produces a signal, and a plot of the signal with respect to position (or time) can be used to represent the conductivity signature. The resulting profile can be smoothed or filtered to remove noise or interference.

Either the entire recorded profile can be stored or a further characterization of the profile can be made and stored. For example, various measures of the profile can be made, such as identifying peak height, peak width, and peak shape, or curve-fitting techniques can be used to provide a mathematical model of the profile. Shown in FIG. 16 is a conventional Gaussian fitting technique where a succession of Gaussians (bell curves) is used to approximate the profile.

Preferably, the conductivity patterns remain stable after first detected and recorded. Additional or alternative coatings can be applied to preserve the signatures, particularly from the effects of moisture. For example, layers of varnish can be printed above or below the signatures to preserve the conductivity patterns for later detection and verification.

Counterfeit cards or other media can be detected by comparing the signatures or lack thereof on the counterfeit cards with signatures stored in a database. If the signatures do not match, a counterfeit is indicated. However, different responses can be made to different degrees of matching. For example, media containing signatures that match to a degree just short of a predetermined threshold for matching can be treated differently from media that do not match at all. A second scan or a scan with a different resolution could be used to determine the authenticity of signatures that nearly match. Counterfeit signatures that match to some degree can be identified as a more sophisticated threat.

The invention can also be practiced as a verification system for game pieces. Each of the game pieces that is to be subject to verification includes a conductivity pattern that varies in an effectively random manner with the conductivity patterns of other of the game pieces. The patterns can be formed on the game pieces in a variety of ways as discussed above.

At least some of the game pieces or combinations of the game pieces are designated as "winners", which entitle the bearers to some sort of award, such as a promotion or prize. Prior to the distribution of the game pieces, capacitive signatures of the game pieces are read or otherwise acquired from the conductivity patterns and recorded in a database. Upon redemption, the authenticity of the game pieces can be verified by re-reading the capacitive signatures of the game pieces and comparing the reacquired capacitive signatures of the individual game pieces with the capacitive signatures stored in the database.

Each of the game pieces is also preferably associated with a unique control code, such as a printed or otherwise embedded code that can be read from the game pieces. Each of the signatures is stored in the database in association with the control code acquired from the same game piece. When presented for redemption, the control codes for the game pieces can be read or otherwise acquired along with the capacitive signatures of the same game pieces. The reacquired signatures can be compared with the signatures in the database by comparing only the signatures linked by common control codes.

The verification system allows game pieces, even those of considerable value, to be chosen (e.g., in a random manner) after the game pieces are produced and ready for distribution. The control codes (e.g., the winning ticket numbers) and the signatures associated with the winning tickets can be identified in the database. If a ticket is presented as a winning ticket matching the correct control code, the alleged winning ticket can be further compared to determine it its capacitive signature matches the capacitive signature of a known winning ticket. Instrumentation for reading the capacitive signatures of redeemed tickets can be provided to remote locations along with access to the database (or a copy thereof) containing the signatures of the winning tickets.

Web-based processes are expected to be most efficient for integrating variable conductivity patterns into printable articles. However, other processes such as sheet processing, as well as various combinations of such processes can be used. Although the conductivity patterns are preferably applied at the time of manufacture of the printable articles, the conductivity patterns could also be applied after the printable articles are made, such as by applying effectively random distributions of conductive material to the articles.

Although digital representations of the capacitive signatures of a set of printable articles can be stored in a common database that is accessible for verifying the authenticity of the same printable media, such digital representations can also be separately printed or otherwise encoded on or in the individual printable articles themselves to provide for independently verifying the authenticity of individual printable articles.

The conductivity patterns applied to the printable articles can be read by capacitive sensors whose operation and digital output is controlled by a digital signal processor connected to the sensors. The output of the digital processor is dependent not only upon the conductivity patterns themselves but is also dependent upon the characteristics and operation of the sensor, the algorithm for interpreting the analog data acquired by the sensor, and the encoding (and/or encryption) scheme of the digital processor for outputting the data. Thus, the digital representation of the signature, such as in a 128 byte code, is itself an otherwise meaningless string of numbers having no intrinsically apparent relationship to the conductivity pattern. Reversing the process to determine the conductivity pattern required to produce a given output of the digital signal processor involves so many variables as to be insuperably difficult.

In place of storing the digital representation of the capacitive signature in a database, the digital representation of the capacitive signature can be encoded on the same printable media on which the conductivity pattern is carried. For example, under the control of the digital signal processor, an encoded digital representation of a capacitive signature can acquired by the capacitive sensor from the conductivity pattern of an individual printable article. The digital representation can then be encoded on the same printable article from which the digital representation was acquired, such as by conventional optically readable printing. Other types of encoding can also be used, including recording the digital signature on magnetic tape. In fact, a conductive barcode or other conductive representation can be separately applied, which can be read by the same capacitive sensor operating according to a different algorithm, such as a barcode interpreting algorithm. The effectively random conductivity pattern and the conductively encoded representation of the pattern are preferably located in different areas of the printable article or are otherwise distinguishable from each other.

Verification of the printable article containing both an effectively random conductivity pattern and an encoded digital representation of the pattern can be carried out independently of any remotely stored information concerning the capacitive signature. A similar capacitive sensor operating according the same digital processing format as the capacitive sensor that originally acquired the digital signature representation reads the conductivity pattern and acquires another digital signature representation of the conductivity pattern. The encoded digital representation is also read. The encoded digital representation and the reacquired digital representation output from the digital signal processor invariably differ from each other on account of signal noise and other processing variations. However, the two digital representation can be compared to each other on the basis of the algorithm that created both. For example, capacitive signals represented by the digital representations can be reconstructed according to the algorithms that encoded them for making a direct comparison between the capacitive signatures. On the basis of this comparison, signatures that do not match can be treated as evidence of counterfeiting.

For example, at the time of manufacture or prior to distribution, an effectively random conductivity pattern can be applied or otherwise embedded into a printable article such as recording medium—a compact disk or magnetic tape, for instance. Also prior to distribution, a capacitive sensor can be used to read the conductivity pattern of the recording medium, and a digital representation of the acquired capacitive signature can be encoded on or in the recording medium. More than one pairing of an effectively random conductivity pattern and its encoded digital representation can be embodied with a recording medium or other printable article, such as at different points along the length of a magnetic tape.

A player or other device for accessing the content of the recording medium can be arranged to include a comparable capacitive sensor set up for operating in accordance with a comparable digital signal processing format as the capacitive sensor that originally acquired the encoded digital representation. The same capacitive sensor or a different sensor (e.g., and optical reader) within the same player can be used to read the encoded digital representation of the capacitive signature. The player itself could be used to read digital representations stored as a part of the contents of the recording medium. Upon acquiring both digital representations of the capacitive signature, a comparison can be made between the two signatures in accordance with a controlling algorithm that can reside within the player or in combination with the contents of the recording medium. If a counterfeit is identified, the player can be programmed to take actions such as by prohibiting access to the contents of the recording medium or even by erasing the contents of the recording medium.

Media that can benefit from the application of unique signatures as described above include tags, tickets, labels, cards, coupons, currency, forms, game pieces, documents and other articles identified by or subject to printing. Some examples of use include product ID tags, passports, bankcards, drug labels, currency, logos, maintenance records, recording media, and other applications where verification of original materials is desired.

The invention claimed is:

1. Print media with individualized signatures comprising;
   a web divided into a succession of printable articles;
   a plurality of conductivity patterns on the succession of printable articles;
   the conductivity patterns differing between printable articles with a variability that is effectively random and detectable as signatures that differ from each other;
   the conductivity patterns being at least partially formed on the web prior to dividing the web into the succession of printable articles and the differences between the conductivity patterns being formed by one or more in-line processes that are not repeated in registration with the succession of printable articles; and
   the in-line processes including printing out of registration with the succession of printable articles.

2. The media of claim 1 in which a portion of each of the conductivity patterns is formed as a reference pattern against which effectively random aspects of each of the conductivity patterns can be compared.

3. The media of claim 1 in which each of the conductivity patterns includes conductivity characteristics that are free to vary over a continuum.

4. The media of claim 1 in which the conductivity patterns are at least partially formed by a printable conductive medium that is applied in patterns.

5. The media of claim 4 in which the conductivity patterns differ from the patterns of the conductive medium in accordance with other variables that affect conductivity characteristics within the patterns of the conductive medium.

6. The media of claim 5 in which the other variables include variations within at least one of the conductive medium, the web, and interactions between the conductive medium and the web.

7. The media of claim 4 in which the patterns of the conductive medium differ between printable articles in a manner that is effectively random.

8. The media of claim 1 in which the conductivity patterns are formed at least in part by the application of a printable conductive medium to the web and are subject to variations in both distributions of the conductive medium over a surface of the web and distributions of conductivity within the surface distributions of the conductive medium.

9. The media of claim 8 in which the conductivity patterns are further subject to variations in the distribution of the conductive medium with respect to a depth dimension of the web normal to the web surface.

10. The media of claim 1 in which the conductivity patterns are formed at least in part by the application of a printable conductive medium to the web, and further comprising an intermediate layer supported by the web to which the conductive medium is applied.

11. The media of claim 10 in which the intermediate layer is a coating on the web.

12. The media of claim 10 in which the intermediate layer is an adhesive.

13. The media of claim 10 in which the intermediate layer is subject to variation for varying of least one of a distribution of the conductive medium over a surface of the web, a distribution of conductivity within the surface distributions of the conductive medium, and a distribution of the conductive medium with respect to a depth dimension of the web normal to the web surface.

14. The media of claim 1 in which the conductivity patterns are subject to further variation between the printable articles after being formed on the succession of the printable articles.

15. The media of claim 14 in which the further variation involves the application of kinetic energy for redistributing conductive elements of the conductivity patterns.

16. The media of claim 1 in which the web is made of a film, an adhesive layer is supported on the film, and the conductivity patterns are applied over the adhesive layer on the film.

17. The media of claim 1 in which the web is a first of two webs, the first web containing a succession of first substrates, a second of the webs containing a succession of second substrates, and the first and second successions of substrates are laminated together to form the printable articles with the conductivity patterns located between the laminated substrates.

18. The media of claim 17 in which the conductivity patterns include separate conductivity patterns on the first and second successions of substrates.

19. The media of claim 18 in which the separate conductivity patterns overlap each other on the laminated substrates.

20. Print media with individualized signatures comprising;
    a web divided into a succession of printable articles;
    a plurality of conductivity patterns on the succession of printable articles;
    the conductivity patterns differing between printable articles with a variability that is effectively random and detectable as signatures that differ from each other;
    the web being made of a film, an adhesive layer is supported on the film, and the conductivity patterns being applied over the adhesive layer on the film; and
    the film being a magnetic film.

21. Print media with individualized signatures comprising;
    a web divided into a succession of printable articles;
    a plurality of conductivity patterns on the succession of printable articles;
    the conductivity patterns differing between printable articles with a variability that is effectively random and detectable as signatures that differ from each other,
    the first web containing a succession of first substrates, a second of the webs containing a succession of second substrates, and the first and second successions of substrates are laminated together to form the printable articles with the conductivity patterns located between the laminated substrates; and
    the first of two webs being a magnetic film that is divided into the succession of first substrates.

22. The media of claim 21 in which the first substrates of magnetic film include front and back surfaces, the conductivity patterns being applied to the back surface of the first substrates of magnetic film, and the back surface of the first substrates of magnetic film being laminated to the second substrates.

* * * * *